Figure 1:
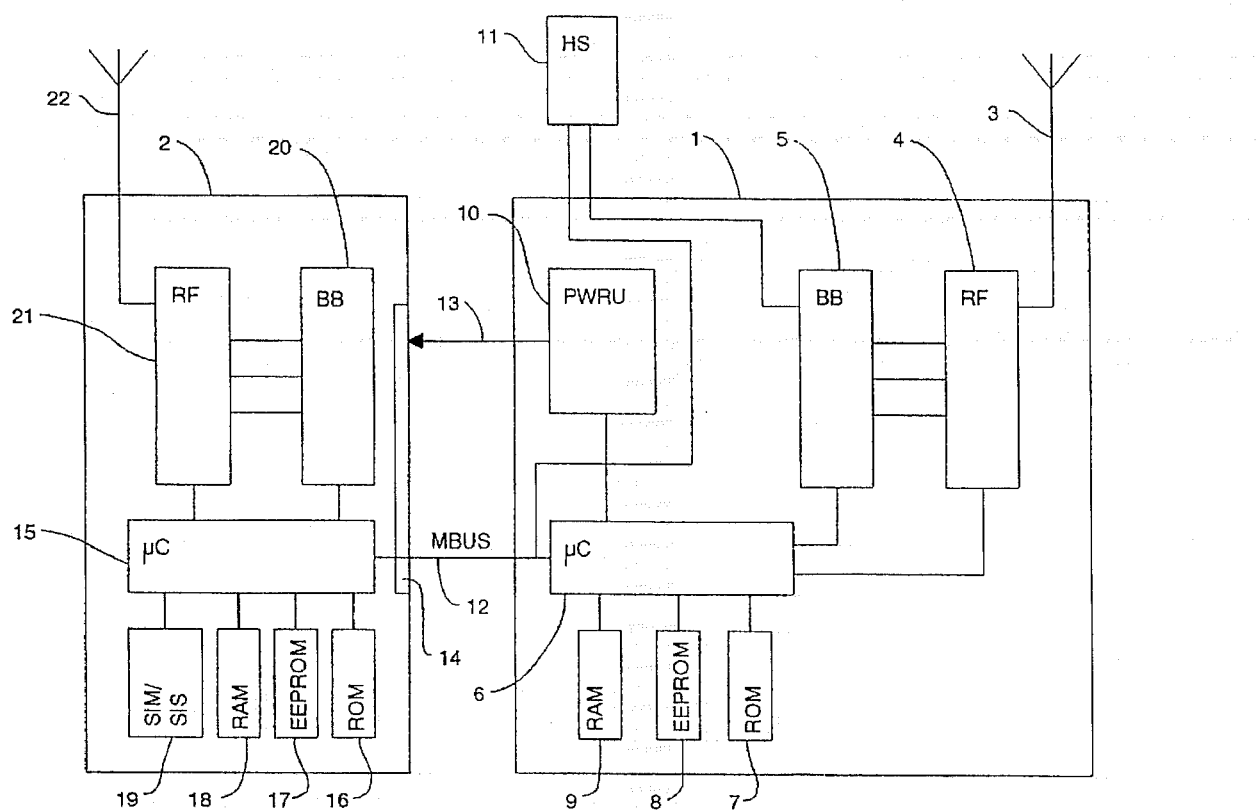

United States Patent [19]

Vimpari et al.

[11] Patent Number: 5,715,522
[45] Date of Patent: Feb. 3, 1998

[54] BOOSTER ARRANGEMENT FOR A PORTABLE TELEPHONE

[75] Inventors: Markku K. Vimpari; Tauno Joakko Jokinen, both of Oulu, Finland

[73] Assignee: Nokia Mobile Phones Ltd., Salo, Finland

[21] Appl. No.: 655,629

[22] Filed: May 30, 1996

[30] Foreign Application Priority Data

Jun. 7, 1995 [FI] Finland .................. 952811

[51] Int. Cl.$^6$ .................. H04Q 7/32
[52] U.S. Cl. .................. 455/88; 455/571; 455/575
[58] Field of Search .................. 455/89, 88, 127, 455/129, 54.1–54.2, 571, 575; 379/58–60

[56] References Cited

U.S. PATENT DOCUMENTS

| | | | |
|---|---|---|---|
| 5,029,233 | 7/1991 | Metroka | 455/33.1 |
| 5,239,690 | 8/1993 | Heinonen | 455/89 |
| 5,291,147 | 3/1994 | Muurinen | 330/136 |
| 5,444,745 | 8/1995 | Ali-Vehmas | 375/347 |
| 5,448,764 | 9/1995 | Sondermann et al. | 455/88 |
| 5,450,620 | 9/1995 | Vaisanen | 455/127 |
| 5,457,814 | 10/1995 | Myrskog et al. | 455/127 |
| 5,551,067 | 8/1996 | Hulkko et al. | 455/127 X |

*Primary Examiner*—Chi H. Pham
*Attorney, Agent, or Firm*—Perman & Green, LLP

[57] ABSTRACT

A booster arrangement for a portable telephone, which includes a telephone (2) and booster (1), and which booster receives identity information from the portable telephone, is characterized in that it incorporates a security procedure in which the booster receives a security query from a mobile communication system and transfers it to the portable telephone, the telephone performs security algorithms and sends an result to the booster and the booster creates an answer to the security query based on the received result. The booster (1) checks the software and hardware versions of the portable telephone (2) and the security procedure is performed based on the version information. Reception of identity information by the booster from the portable telephone also is performed based on said version information. By means of the present invention, equally good security is obtained when using a booster arrangement as when using a portable telephone. Security can also be realized when the portable telephone (2) belongs to a different system than the booster (1).

15 Claims, 4 Drawing Sheets

BOOSTER ARRANGEMENT FOR A PORTABLE TELEPHONE

The present invention is related to a booster arrangement for a portable telephone, and in particular, the present invention is directed to improving security when using said booster arrangement.

Currently, mobile telephones are generally very small, portable telephones and they operate at low power. Consequently, the telephones operate poorly in locations with poor base station coverage, such as sparsely populated areas. The conventional solution for improving usability and convenience of a low-powered, portable telephone is then a simple RF booster, which amplifies and filters RF signals transferred back and forth between the portable telephone and an antenna, and improves usability in the available coverage of the cellular system of the portable telephone.

Coverage of new mobile communication systems in particular, such as GSM or DCS 1900 or DCS 1900, is limited, at least for the present, and naturally there is no benefit from an RF booster outside the system's area of coverage. Therefore, a car telephone of another system having better coverage (e.g NMT or AMPS) is often used in addition to a modern digital system portable phone. In Finland, for example, an NMT 450 system car telephone is often used along with a GSM portable telephone, because the NMT 450 cellular system has the best coverage and a car telephone operates at higher power than a portable telephone. However, it is disadvantageous for a subscriber to purchase mobile telephones belonging to two different systems and pay subscriber charges for both of them.

It is also known to use a mobile telephone capable of making calls independently, such as a car telephone, which has higher power than a portable telephone, as a booster for a portable telephone. U.S. Pat. No. 5,029,233 presents a solution whereby a portable telephone's identity information, subscriber-specific information such as short code memory information, and system information can be transferred from a portable telephone to a car telephone, which then operates as if it were a portable telephone, but using higher power. This solution allows both telephones to be used as one telephone, avoiding the expenses of having two mobile telephones.

A booster arrangement may also be based on a booster which as such cannot be used to independently make calls, but which nevertheless comprises all the parts required by a mobile telephone and is equipped with processor and memory components and software that allow it to operate as a mobile telephone upon receiving identity and other necessary information from a portable telephone. Said solution can be developed further, so that the booster could be a device that operates in a suitable mobile communication system, and which could make calls within its own system based on identity and other information received from a portable telephone belonging to a different mobile communication system. Said solution could be implemented in practice, because, for example, at least some manufacturers of mobile communication devices use the same standard interface and connector in telephones belonging to different systems. Implementation requires interfacing of portable telephone and booster operation by means of suitable software and necessary supplementary functions. Implementation may also need the support of the operators.

The disadvantage of booster arrangements for portable telephones described above, in which the booster is another mobile telephone capable of independently making calls or a device including processor and memory components which is capable of making calls upon receiving specific identity and other information from a portable telephone, is the weakening of subscriber security, because the security codes or algorithms in a portable telephone cannot be transferred from the portable telephone to a booster. The security provided by the information would be diminished to such an extent, if the transfer were possible, that it could not be allowed. Furthermore, it would be extremely difficult to implement the transfer in practice.

The foregoing disadvantages and problems are overcome by a booster arrangement for a portable telephone according to the present invention, which includes a portable telephone and a booster and in which the booster receives identity information from the portable telephone, wherein a security procedure is performed in the arrangement, in which: the booster receives a security query from a mobile communication system and transfers the query to the portable telephone; the portable telephone performs security algorithms and sends a result to the booster; and the booster forms an answer to the security query based on the result received from the portable telephone.

In one advantageous embodiment of the booster arrangement for a portable telephone according to the present invention, the booster checks the software and hardware version information of the portable telephone and performs a security procedure dependent on the version. The version information also indicates which system the portable telephone belongs to.

In another advantageous embodiment of the present invention, reception of identity information is also dependent on the version of the portable telephone.

The benefit of the present invention is that subscriber security may be as good when using a booster as when using a portable telephone. In an arrangement according to the present invention, security is realized also when the booster functions in a first mobile communication system and the portable telephone functions in a second mobile communication system.

The term security and its derivatives are used in the present patent application as general names for concepts which are related to various forms of security used in mobile communication, in other words, authentication, ciphering and subscriber identity protection. In the following examples of embodiments, the security procedure only comprises of authentication, but in principle, a security procedure realized in the same way also may include other forms of security.

In the present patent application, identity information refers to identity information tied to a mobile communication device or its subscriber. In the following examples of embodiments, the booster needs a number and a country code in order to operate in its own system. If the portable telephone belongs to the same system, the booster will receive the identity information as is from the portable telephone. The identity information received from the portable telephone may be the subscriber's international subscriber identity (IMSI, International Mobile Subscriber Identity), for example, from which the booster obtains the identity information it needs by means of a conversion. The identity information received from the portable telephone may be in ciphered form for certain reasons and may contain a password by which the correctness of the received information can be verified. As it is also possible to integrally transfer other data necessary for booster operation than identity information from the portable telephone to the booster during an initialization phase, the present patent application also refers to data which includes identity information.

Embodiments of the present invention are described in detail below, only as examples, with references to the enclosed drawings.

Figure 2:
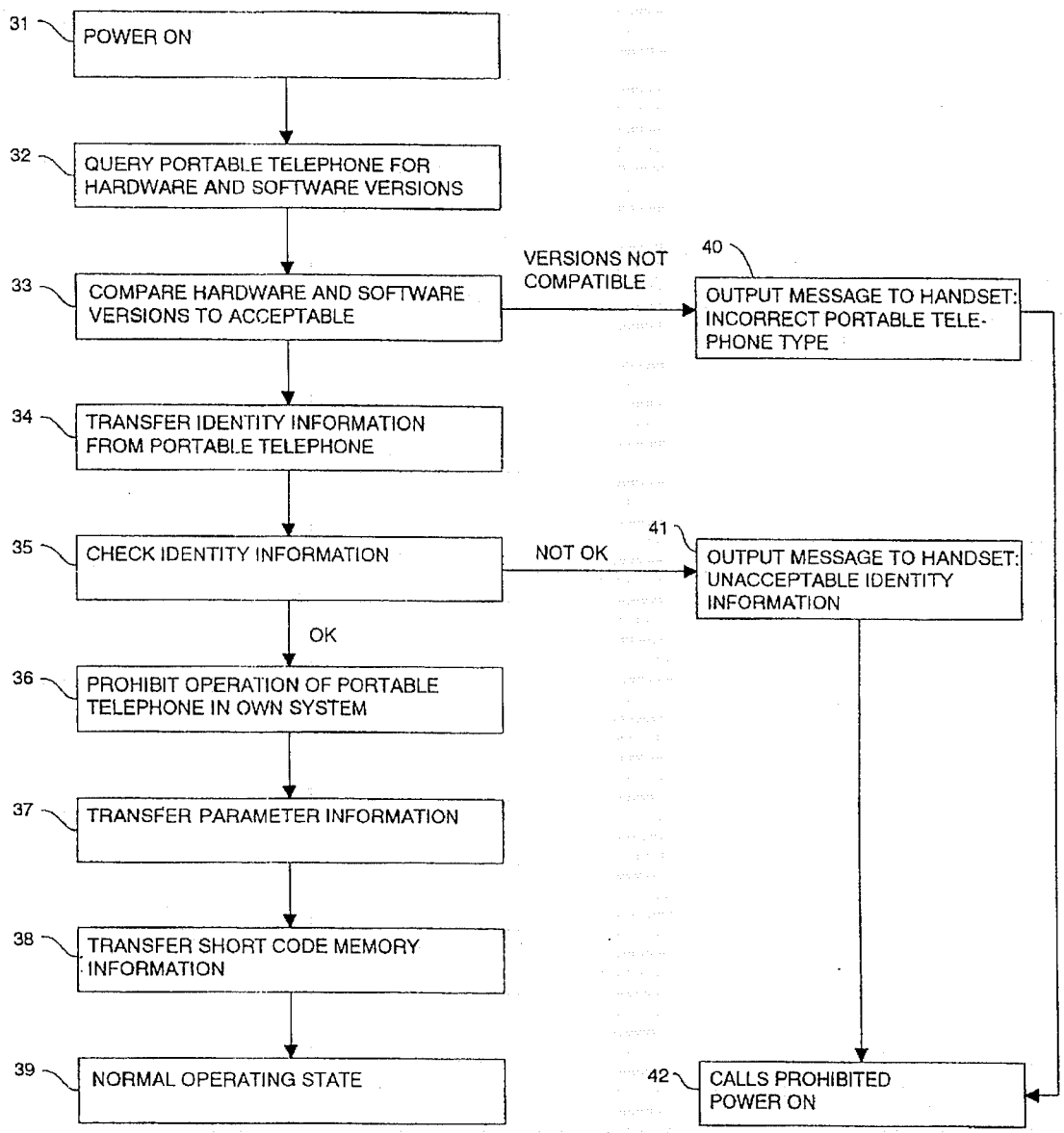
Figure 3:
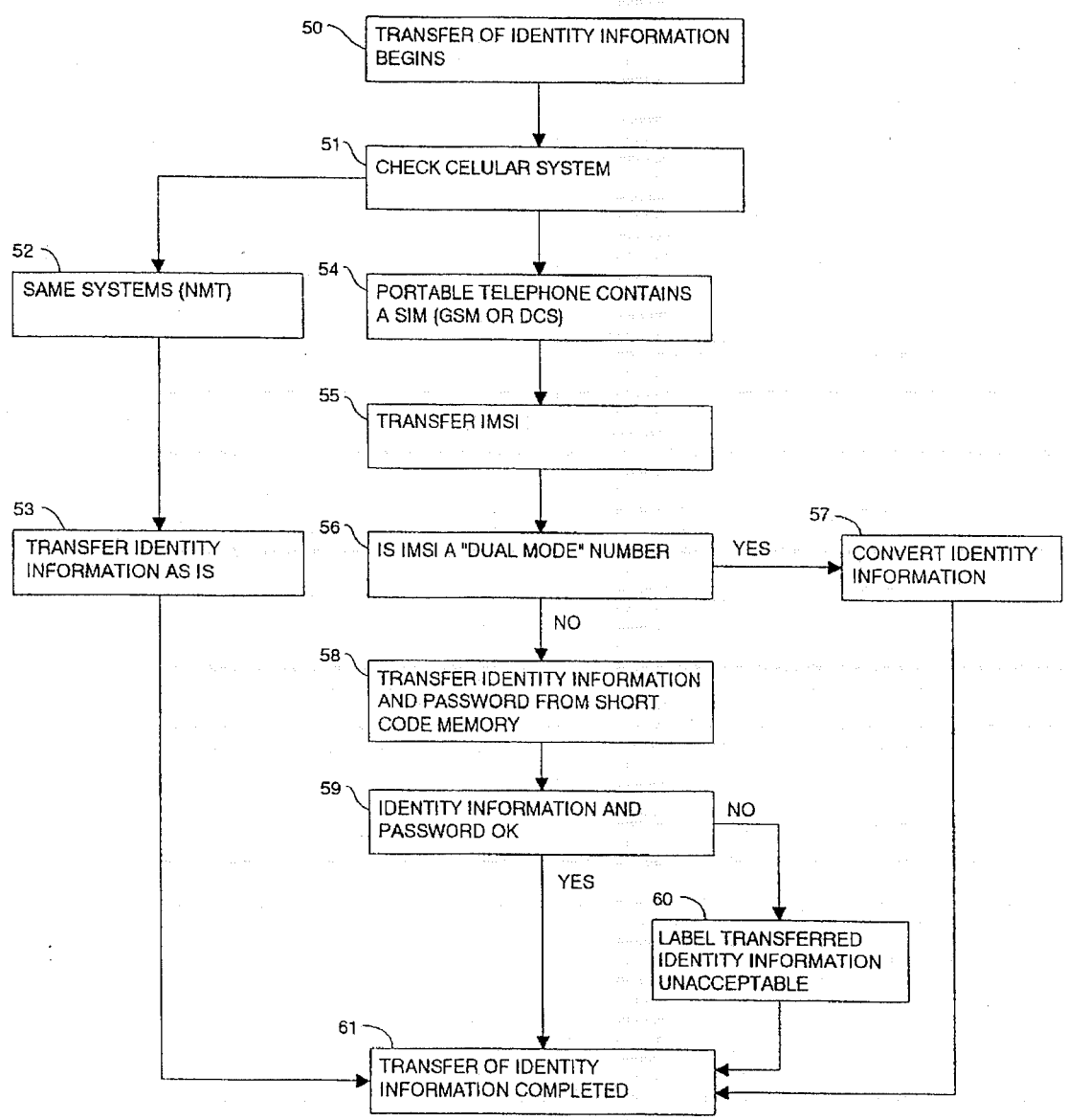
Figure 4:
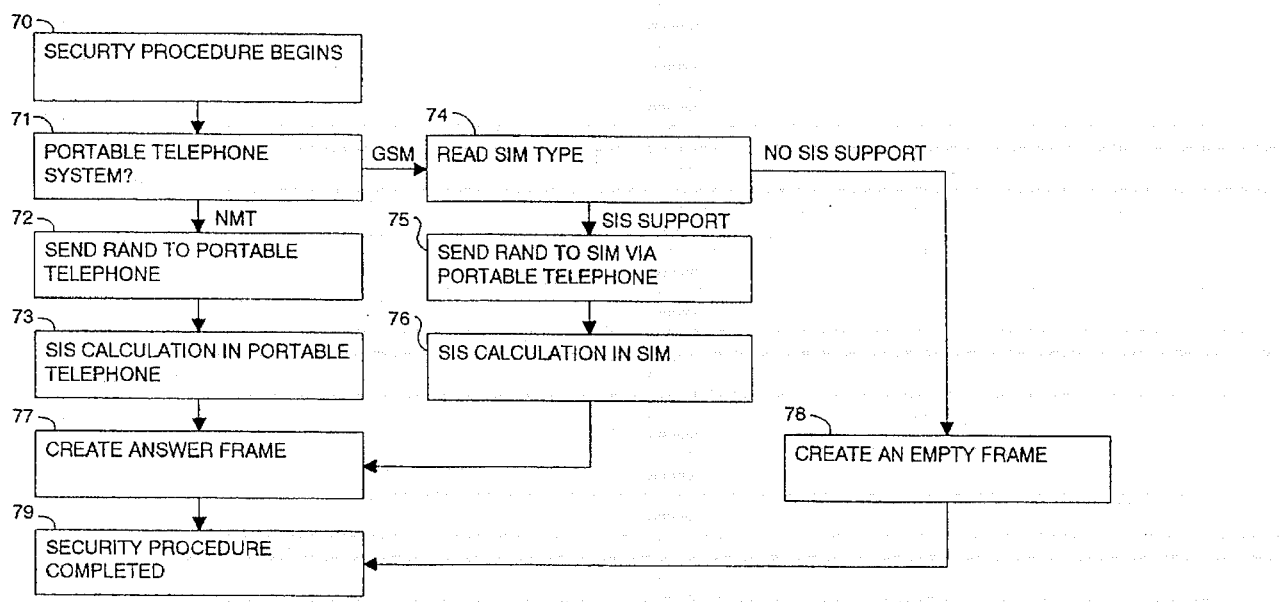
Figure 5:
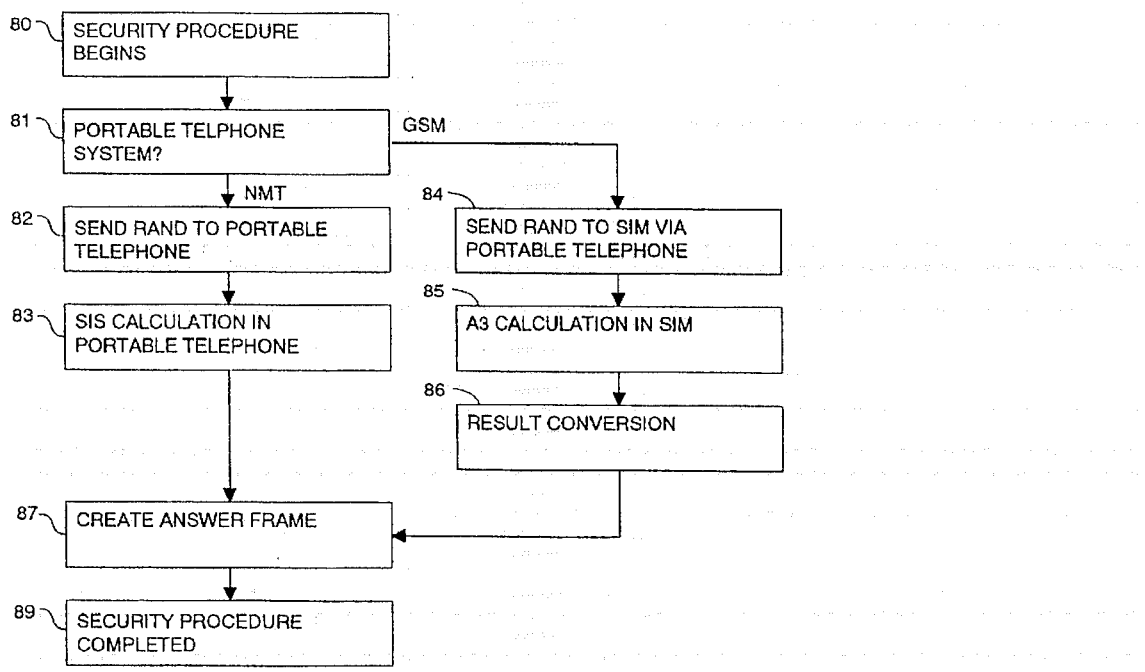

FIG. 1 presents a simplified block diagram of an embodiment of a booster arrangement for a portable telephone according to the present invention, FIG. 2 is a flow chart which presents the general operation during an initialization phase of a booster arrangement according to the present invention, FIG. 3 is a flow chart which more closely presents alternative realizations of reception of identity information during said initialization phase, and FIGS. 4 and 5 are flow charts which more closely present embodiments of security procedures of a booster arrangement for a portable telephone according to the present invention.

FIG. 1 presents a simplified block diagram of a booster arrangement for a portable telephone according to the present invention, which is made up of a portable telephone 2 and a booster 1. The portable telephone usually is placed in a holder, in which a connector of the telephone connects to a corresponding connector of the holder. Booster 1 is a device that operates in a mobile communication system and comprises a radio frequency part 4, which includes an antenna 3, and a base band part 5 as well as necessary processor and memory components 6–8, which usually are not separate blocks in practical implementations, as they are in the figure. Software required by the booster is stored in ROM 7, different types of parameters and other similar information are stored in EEPROM 8, and the device also contains a necessary amount of RAM 9. The portable telephone 2 is thereby connected to the booster 1 by means of a bus 12 and advantageously also a power supply connection 13 belonging to a connector 14, advantageously a standardized connector, by which the portable telephone receives power from a power unit 10 of the booster when connected to the booster. From the standpoint of the present invention, in principle, the bus 12 can be any suitable data transfer bus, but in a preferred embodiment the bus is a standardized serial bus which is used to convey control and information signals between a portable telephone and auxiliary equipment connected to the telephone. An example of such a bus is Nokia MBUS. In said embodiment, the booster has its own handset 11, which ordinarily includes a microphone, speaker, keyboard and display, for example. A portable telephone could also function as a handset, but this would require considerably more programming, especially in the portable telephone.

The portable telephone 2 correspondingly contains a radio frequency part 21 and a related antenna 22, a base band part 20 as well as processor components and ROM 16 for storing software, EEPROM 17 for storing various parameter data and a necessary amount of RAM 18. Depending on the system of the portable telephone, the telephone may also include a special SIS processor for performing security algorithms or a SIM module which contains identity information and performs security algorithms. This block is referred to with reference number 19. For example, an NMT telephone includes a SIS processor and a GSM telephone includes a SIM module.

The flow chart of FIG. 2 presents operation during an initialization phase of one embodiment of a booster arrangement according to the present invention, in other words, when power is switched on to the booster in phase 31. In an advantageous embodiment, the booster is switched on when a portable telephone is placed in an integral holder containing a connector. In the following phase 32, the booster queries the portable telephone for its hardware and software versions. As stated above, realization of this type of booster arrangement requires compatibility between the portable telephone and the booster. The software version information of the portable telephone is stored in ROM during manufacture at the same time as the software is stored. Information about the hardware version is needed because telephones meant for use in different countries may exist which have the same software but different hardware because they operate at different frequencies or signalling may be different. Hardware version information is stored in EEPROM of the portable telephone together with other similar parameter information. In phase 33, the booster compares the received version information with valid version information stored in EEPROM. If the versions are not acceptable, the booster informs the subscriber about this in phase 40 by displaying a message in the display of the handset of the booster. This is followed by phase 42, a state during which the booster is prevented from making calls. If the hardware and software versions are acceptable, identity information is transferred from the portable telephone to the booster in phase 34. Different alternatives of phase 34 are explained in more detail below with reference to FIGS. 3 and 4. For example, the booster now knows which cellular system the portable telephone connected to the booster belongs to, and the method of transferring the identity information is selected accordingly. In the next phase 35, the booster verifies that the received portable telephone identity information is correct. For example, it may be that certain identity information or identity information formed in a specific way is required from the portable telephone before it is identifiable in connection with the booster. If the identity information is not acceptable, the subscriber can be informed of this in phase 41, followed by phase 42 in which calls through the booster are prevented and the booster operates only as a power supply for the portable telephone, which is still capable of making calls through its own cellular system. If the received identity information is correct, the portable telephone is prevented from operating in its own cellular system in phase 36. Thereafter, the arrangement formed by the portable telephone and the booster will only operate through the booster in its own cellular system. In phase 37, cellular system parameter information can be transferred or loaded into the booster from the portable telephone. This especially applies to a situation in which the booster operates in the same system as the portable telephone and in this way receives information about the location area or channel, for example, in which the portable telephone last operated. The booster is able to enter the operating mode directly, without having to search for a channel or update its location. Next, in phase 38, the contents of the portable telephone's short code memory are loaded into the corresponding memory of the booster. This lets the subscriber use the booster arrangement according to the present invention like a portable telephone which has a conventional booster that functions only as an RF amplifier. The cellular software of the booster is running in phase 39 and it is a mobile telephone in its normal operating mode in its own cellular system.

It should be noted that the booster arrangement for a portable telephone according to the present invention differs from similar arrangements of the prior art in that the booster queries the portable telephone for hardware and software version information, checks the information and receives the identity information of the portable telephone in a manner dependent on the version. The hardware and software version information also makes it possible to perform a security procedure in a manner dependent on the version. This characteristic according to the present invention makes it possible for the booster to operate together with portable telephones belonging to different systems.

The performance of phase 34 of the flow chart of FIG. 2, or the transfer or reception of identity information from the portable telephone to the booster, will be examined in more detail in the following, with reference to the flow chart of FIG. 3. In this example, the booster is a device operating in an NMT system and the portable telephone can be an NMT telephone or a GSM telephone or the like. The transfer of the identity information begins in phase 50. The cellular system of the portable telephone is checked in phase 51 based on the received hardware and software information. If the systems of the booster and portable telephone are the same in phase 52, or they are both NMT devices, i.e., belong to the same system group, the identity information is not converted, but is transferred as is to the booster in phase 53. The identity information required by the NMT booster are a number and a country code. If, on the other hand, it is determined in phase 54 that the portable telephone contains a SIM module, i.e., it is a GSM or DCS telephone, the international subscriber identity IMSI is transferred from the portable telephone to the booster in phase 55. Next, the subscriber identity type is checked in phase 56. If the identity is a so-called general, or dual mode number, a 9400 series number in Finland, behind which there are several mobile communication system numbers, this general number is converted to an identity information form required by the cellular system of the booster, or NMT form in this example. With the cooperation of the operator, the IMSI identity contains an NMT type identity for the booster that is obtained by means of a conversion. The conversion is performed in the booster in the same way as it is performed in a network when a 9400 series number is converted to a number for a specific system. The arrangement can be such that a conversion is agreed upon with the operator by which suitable and acceptable identity information, in this case a number and country code, for the booster is obtained from all the IMSI numbers or a certain part of them, such as certain types of numbers. Numbers are not actually handled in this form in a telephone, but the conversion is presented in this form for illustration, which happens in the same way as the actual conversion in principle. If the conversion is not successful based on the IMSI number, one possible method of realization is that the NMT number is stored in a SIM module in a short code memory location. Such a realization does not require any changes to the IMSI number or SIM card usage or in signalling between the system and the portable telephone. In this case it is recommendable to use a password in addition to the number to ensure that the correct identity information is received. A possibility exists that, for some reason, the memory location from which the information is retrieved contains incorrect information. The transferrable identity information can be completely in ciphered form, and the correctness of the information is checked by deciphering the password. The information can be saved by means of a computer program using binary numbers, for example, so that the subscriber cannot key in a number that is the subscriber's ciphered NMT identity information located on the SIM card. In this type of realization, the identity information is transferred from a specific short code memory location in the SIM card to the booster in phase 58. In phase 59, the identity and password are checked for acceptability, and if they are acceptable, the transfer from the portable telephone to the booster is completed in phase 61. It is possible that, although the version information of the portable telephone received in phase 59 is correct, the identity information is incorrect or unacceptable, so in phase 60 it is ascertained that the transferred identity information is not usable.

A characterizing feature of a booster arrangement according to the present invention is that it also realizes a security procedure. In connection with this, the following deals with principles by which security procedures, mainly inspection of the right to use a mobile telephone, or authentication, is performed in different systems. The general principle is that the network sends a random number to a mobile telephone as a security query, from which the mobile telephone calculates a corresponding random number using the telephone's security algorithm and sends the number to the network as an answer to the query. The network has also performed calculations from the same random number it sent to the telephone, using the same algorithm, and the network compares its own resulting random number with the answer received from the telephone.

In a so-called SIS function (Subscriber Identity Secure), which is used in an NMT system, for example, each subscriber is supplied with a personal secret key, SAK (Subscriber Authentication Key), which is programmed at the factory during manufacture. At the same time, a reference number is programmed into the telephone which is used to link the SAK to the telephone number when the telephone is purchased. The SIS function checks the identity of the caller immediately at the beginning of a call. First of all, the network sends the telephone a random number, RAND (Random Challenge), after which a response, SRES (Signed Response), is calculated using a complicated algorithm and the SAK and RAND. A B key, which is needed later, is also calculated. The result of the calculation is sent to an exchange for verification, and then a B subscriber number is sent which is ciphered with the help of the B key.

In new digital systems, such as GSM, authentication is performed in a similar manner. Subscribers have a SIM module containing a subscriber-specific secret key, Ki. A response SRES to a random number RAND sent from the network is calculated in the telephone's SIM module with the help of a specific algorithm A3 and a key Ki and SRES is sent to the network, where it is checked by comparing it to a corresponding value calculated locally in the network.

Examples of different alternatives for performing security procedures in an arrangement according to the present invention will be described in the following, with reference to FIGS. 4 and 5. The security procedure is performed in a normal manner at the beginning of each call. In the alternative procedure shown in FIG. 4, the security procedure is started in phase 70, when a security query arrives from the network. In this example, it is assumed that the booster is a device operating in an NMT system. The cellular system of the portable telephone is checked in phase 71. If the portable telephone is an NMT telephone, i.e., belongs to the same system group, the RAND received from the network in phase 72 is transferred on to the portable telephone. The portable telephone performs the SIS calculation in normal fashion in phase 73. After that, in phase 77, an answer frame can be created from the result. On the other hand, if it is determined in phase 71 that the portable telephone is a GSM telephone, the SIM module type is read in phase 74. If it is determined that the SIM module supports performance of the SIS procedure, the RAND received from the network is sent to the SIM module via the portable telephone in phase 75. The SIM module can support the SIS procedure, because the security algorithm used by the SIM module is not specified, and it can be freely selected by the operator.

Therefore, an interesting alternative is that the SIM module uses the same algorithm (SIS algorithm) that the network of the booster uses. Only the length of the bit fields processed by the SIM module is defined in the security procedure of the SIM module. SIM module operation that supports the SIS procedure requires the cooperation of the operator(s), that is, a decision to use the same algorithm in the SIM modules of portable telephones and the network of the booster. The SIS calculation is performed with the SIM card in phase 76 of the flow chart in FIG. 4, and the answer frame can be created from the result in phase 77. If it is determined in phase 74 that the portable telephone contains a SIM module that does not support the SIS procedure, an empty answer frame is created in phase 78. This means that no result is calculated for a security answer, i.e., a security procedure is not performed. In order to continue operation, the network must be aware of the fact that an empty frame will be given as an answer to the security query with the identity information in question. The security procedure is completed in phase 79.

The flow chart in FIG. 5 presents an alternative implementation of a security procedure, and the main branch of the flow chart formed by phases 80–83, 87 and 89 is the same as the corresponding branch in FIG. 4 formed by phases 70–73, 77 and 79. A prerequisite of this implementation is that the security center of the portable telephone network is accessible from the booster network. If it is determined in phase 81 that the portable telephone is a GSM telephone, the RAND received from the network is sent to the SIM module via the portable telephone. Now calculation is performed in phase 85 using the algorithm of the GSM network and the SIM module of the portable telephone. The length of the resulting bit field will differ from the result that would have been obtained with the calculation performed by the SIS algorithm. Therefore, the result has to be modified in phase 86 by shortening it in a specified way, for example, to form a bit field with the same length as a bit field obtained with a SIS calculation. An answer frame is created in phase 87 and the security procedure is completed in phase 89. The mobile phone exchange of the booster network checks the answer by means of an algorithm which it has received from the network of the portable telephone, in other words, its security center, or it requests the network of the portable telephone to perform the check of the answer.

The invention has been particularly shown and described with respect to certain embodiments thereof. For example, the mobile communication systems viewed in the first place above are the Nordic NMT system and the European GSM system. It will be understood by those skilled in the art that the invention may be applied to many other mobile communication systems as well, e.g., the booster may belong to AMPS system and the portable telephone may belong to DCS system. Also many other changes in form and detail may be made without departing from the scope and spirit of the invention.

We claim:

1. A booster arrangement for a portable telephone which includes a portable telephone and a booster and in which the booster receives identity information from the portable telephone, comprising a security procedure in which:

the booster receives a security query from a mobile communication system and transfers the query to the portable telephone;

the portable telephone performs security algorithms and sends a result to the booster; and the booster creates an answer to the security query based on the received result.

2. The booster arrangement for a portable telephone according to claim 1, wherein the security procedure includes the authentication of the portable telephone.

3. The booster arrangement for a portable telephone according to claims 1 wherein the booster checks software and hardware version information of the portable telephone and the security procedure is performed dependent on the received version information.

4. The booster arrangement for a portable telephone according to claim 3, wherein the booster informs the user if the software or hardware version of the portable telephone is not acceptable.

5. The booster arrangement for a portable telephone according to claim 3, wherein reception of identity information from the portable telephone to the booster is performed dependent on the acquired version information and the booster verifies that the identity information is acceptable.

6. The booster arrangement for a portable telephone according to claim 5, wherein the booster informs the user if the identity information of the portable telephone is not acceptable.

7. The booster arrangement for a portable telephone according to claim 5, wherein further the calls through the booster are prevented and the booster is operable only as a power supply for the portable telephone if the identity information of the portable telephone is not acceptable.

8. The booster arrangement for a portable telephone according to claim 1 wherein:

the booster and the portable telephone belong to the same mobile communication system or system group; and the booster sends the result received from the portable telephone to the mobile communication system as an answer to the security query.

9. The booster arrangement for a portable telephone according to claim 8, wherein the booster receives system information, including information about the present location area or last used channel, from the portable telephone.

10. The booster arrangement for a portable telephone according to claim 1, wherein:

the booster and the portable telephone belong to different mobile communication systems;

a security algorithm used by the mobile communication system of the booster is implemented in the portable telephone; and the booster sends the result received from the portable telephone to the mobile communication system as an answer to the security query.

11. The booster arrangement for a portable telephone according to claim 10, wherein a SIS processor of NMT system is implemented in a GSM portable telephone.

12. The booster arrangement for a portable telephone according to claim 10, wherein the authentication algorithm of AMPS system is implemented in a DCS portable telephone.

13. The booster arrangement for a portable telephone according to claim 1, wherein:

the booster and portable telephone belong to different mobile communication systems;

the portable telephone performs a security algorithm of its own system; and the booster creates an answer to the security query from the result received from the portable telephone by means of an agreed conversion.

14. The booster arrangement for a portable telephone according to claim 13, wherein the mobile communication system of the booster checks the answer by using an algorithm of the mobile communication system of the portable telephone.

15. The booster arrangement for a portable telephone according to claim 13, wherein the mobile communication system of the booster requests the mobile communication system of the portable telephone to check the answer.

* * * * *